(12) United States Patent
Kalmady et al.

(10) Patent No.: US 11,082,385 B2
(45) Date of Patent: Aug. 3, 2021

(54) SYSTEMS AND METHODS FOR A FLEXIBLE EVENT SERVICE

(71) Applicant: Cambia Health Solutions, Inc., Portland, OR (US)

(72) Inventors: Gaurav Dinesh Kalmady, Pittsburgh, PA (US); Sriram Krishnan, Bellevue, WA (US); Yi Ju Tsai, Seattle, WA (US)

(73) Assignee: CAMBIA HEALTH SOLUTIONS, INC., Portland, OR (US)

( * ) Notice: Subject to any disclaimer, the term of this patent is extended or adjusted under 35 U.S.C. 154(b) by 0 days.

(21) Appl. No.: 16/695,875

(22) Filed: Nov. 26, 2019

(65) Prior Publication Data

US 2020/0177534 A1 Jun. 4, 2020

Related U.S. Application Data

(60) Provisional application No. 62/774,675, filed on Dec. 3, 2018.

(51) Int. Cl.
| | |
|---|---|
| G06F 9/54 | (2006.01) |
| H04L 12/58 | (2006.01) |
| H04L 29/08 | (2006.01) |
| H04L 9/08 | (2006.01) |

(52) U.S. Cl.
CPC .............. H04L 51/24 (2013.01); G06F 9/542 (2013.01); H04L 9/0825 (2013.01); H04L 51/00 (2013.01); H04L 51/26 (2013.01); H04L 67/02 (2013.01)

(58) Field of Classification Search
CPC .. G06F 9/542; G06F 9/0825; G06F 16/90335; G06F 16/958; H04L 51/00; H04L 51/24; H04L 51/26; H04L 51/22; H04L 67/02; H04L 12/4625; H04L 67/10; H04L 9/0825; G16H 40/67; G16H 50/70
See application file for complete search history.

(56) References Cited

U.S. PATENT DOCUMENTS

| | | | |
|---|---|---|---|
| 5,592,664 | A | 1/1997 | Starkey |
| 5,999,978 | A | 12/1999 | Angal et al. |
| 6,298,378 | B1 | 10/2001 | Angal et al. |
| 6,766,368 | B1 | 7/2004 | Jakobson et al. |
| 8,595,322 | B2 | 11/2013 | Vasters |
| 9,928,379 | B1 * | 3/2018 | Hoffer .................... G16H 50/70 |

(Continued)

*Primary Examiner* — Le H Luu
(74) *Attorney, Agent, or Firm* — McCoy Russell LLP

(57) ABSTRACT

The current disclosure is directed towards systems and methods for automatically distributing an event comprising a plurality of key-value pairs, to a plurality of event subscribers, based on the plurality of key-value pairs satisfying one or more Boolean filters uniquely corresponding to one or more of the event subscribers, which may enable an increase in event distribution efficiency. In one example, this may increase event distribution efficiency by enabling a reduction in data exposure, as an event subscriber may receive only those events which satisfy a Boolean filter defined by the subscriber, and registered with the event conduit, and therefore, broadcast of events to uninterested subscribers may be reduced. Subscribers may specify interest in as broad, or as narrow a range of events as they wish, and thereby a more efficient match between subscriber interest and which events are distributed to that user may be enabled.

20 Claims, 6 Drawing Sheets

(56) References Cited

U.S. PATENT DOCUMENTS

| | | | |
|---|---|---|---|
| 2005/0071849 A1* | 3/2005 | Hinson | G06F 9/4488 |
| | | | 719/315 |
| 2005/0192952 A1* | 9/2005 | El-Shimi | G06F 9/542 |
| 2007/0156656 A1* | 7/2007 | Pather | G06F 9/542 |
| 2008/0063154 A1 | 3/2008 | Tamari et al. | |
| 2010/0138772 A1* | 6/2010 | Garcia | G06F 16/958 |
| | | | 715/774 |
| 2013/0085765 A1* | 4/2013 | Tuchinda | G16H 40/67 |
| | | | 705/2 |
| 2015/0212811 A1* | 7/2015 | Miller | G06F 9/542 |
| | | | 717/120 |
| 2016/0034322 A1* | 2/2016 | Braudes | H04L 12/4625 |
| | | | 709/204 |
| 2017/0085512 A1* | 3/2017 | Bray | H04L 51/22 |
| 2017/0116210 A1* | 4/2017 | Park | G06F 9/542 |
| 2018/0174107 A1* | 6/2018 | Khwaja | H04L 67/10 |
| 2019/0147092 A1* | 5/2019 | Pal | G06F 16/90335 |
| | | | 707/713 |

* cited by examiner

| Key | Relationship | Value | Operator | Subscriber ID |
|---|---|---|---|---|
| K1 | == | V1 | AND | S1 |
| K2 | >= | V2 | AND | S1 |
| K1 | < | V1 | OR | S2 |
| K1 | < | V1 | AND | S3 |
| K2 | == | V3 | AND | S3 |
| K1 | < | V5 | OR | S4 |
| K2 | == | V4 | OR | S4 |
| K1 | <= | V1 | AND | S5 |
| K2 | == | V1 | AND | S5 |
| K3 | == | V6 | AND | S5 |

FIG. 7

700 curl -X POST -H "Content-Type: application/json" -d '{"event-type": "RawDataIngestionComplete", "data-set-id" : "3d94946c-84a2-46fa-9020-6c7b66da8b2e" "ingest-timestamp" : "2018-01-14T20:15:10Z"}' https://event-service.com/v1/tenants/<tenant-name>/namespaces/<name-space>/raiseevent

HTTP curl -X POST -H "Content-Type: application/json" -d '{"callback_body": {"mechanism": "HTTPS", "parameters": {"url": "https://subscribe1.typicode.com/posts", "method": "POST"}}, "event_filter" : "dataset_id == 12345 && modified_time > 2018-01-21T00:20:02Z"}' https://event-service.com/v1/tenants/tenant1/namespaces/dev/regcallback

SQS curl -X POST -H "Content-Type: application/json" -d '{"callback_body": {"mechanism": "SQS", "parameters": {"url": "https://queue.amazonaws.com/<queue_name>", "method": "ENQUEUE"}}, "event_filter" : "dataset_id == 12345 && modified_time > 2018-01-21T00:20:02Z"}' https://event-service.com/v1/tenants/tenant1/namespaces/dev/regcallback

SYSTEMS AND METHODS FOR A FLEXIBLE EVENT SERVICE

CROSS REFERENCE TO RELATED APPLICATIONS

The present application claims priority to U.S. Provisional Patent Application No. 62/774,675, entitled "FLEXIBLE EVENT SERVICE", filed on Dec. 3, 2018. The entire contents of the above-listed application are incorporated herein by reference for all purposes.

FIELD

The present application relates to systems and methods for distributing events to a plurality of event subscribers using an event conduit.

BACKGROUND AND SUMMARY

Computing systems may be communicatively coupled to one another through a variety of network connections. Network connections may include, but are not limited to, connections via wired or wireless Ethernet, cellular connections, or even computer to computer connections through serial, parallel, USB, or other connections. Computing systems connected via a network connection may communicate synchronously, or asynchronously to access services at other computing systems and to quickly and efficiently receive data from other computing systems.

One method of asynchronous communication between network connected computing systems comprises sending and receiving events based on a pre-specified condition being met. In this method, a user may register one or more computing systems to receive information, in the form of an event, from an event producer, upon occurrence of a pre-specified condition. In one example, a user may have an interest in receiving the latest certain kind of data added to a healthcare database, the user may therefore register a computing device (the event subscriber in this example) with the healthcare database (the event producer in this example), to receive information from the database regarding changes or updates made to the database, wherein the changes/updates comprise the pre-specified condition in this example. In one example, an event may comprise a packet of data relating to the pre-specified condition, or other data, wherein the pre-specified condition may include an update or change to one or more computing systems, databases, or other devices/data structures. The event may be sent to a plurality of computing systems and/or HTTP endpoints previously registered to receive the event. Expanding on the above example, registering a computing device to receive an event from the healthcare database may comprise specifying one or more endpoints/callback mechanisms with the healthcare database, or service associated with the healthcare database, indicating a digital address (e.g. an HTTP address, an email address, a SMS address, etc.) to route the event to upon satisfaction/occurrence of the pre-specified condition (e.g. ingestion of new data by the healthcare database). As another example of asynchronous communication between computing systems through transmission/reception of events, data arrives in a data lake in a variety of fashions, either through periodic batch based pull processes or written synchronously in to the lake by various data transformation processes such as business logic specific transformations or linkage or data cleaning. The data itself may not be governed and usable in its raw form. Metadata collection, data quality validation and time variant merging may occur before this data may be consumed. Users/computing systems interested in this data may subscribe to receive notification in the form of an event when data stored in the data lake changes state and/or when new data is available.

In order to efficiently distribute events generated by a plurality of event producers, to a plurality of event subscribers, a number of distribution methods have been developed. A first conventional method of event distribution comprises each subscriber interested in receiving events from an event producer registering one or more interfaces directly with the event producer, wherein each interface includes one or more callback mechanisms/endpoints indicating routing information for the event upon occurrence of a pre-specified condition. According to this method, each of the plurality of event subscribers may register one or more interfaces with each event producer from which the subscribers wish to receive events, such that a single subscriber may register n separate interfaces with n distinct event producers in order to receive events from each of the n event producers (where n is a positive, non-zero, integer). Thus, in this method, event producers and event subscribers are directly coupled through interfaces registered by the event subscribers with the event producers.

A second conventional method of event distribution comprises the subscribers taking a subscription on (that is, registering a callback mechanism/endpoint with) a specific notification channel, queue, or topic. In this method, event subscribers and event producers are not directly coupled. Event producers pipe events to each event channel/queue/topic based on the type of event produced, and the channels/queues/topics available, and subscribers subscribe to the event channels/queues/topics based on interest, the event channel/topic/queue then distributes events it receives from the plurality of event producers to the plurality of registered callback mechanisms/endpoints corresponding to the plurality of event subscribers. This method enables subscribers to subscribe to a generic class of events without creating separate interfaces for each event/event producer in which the subscriber has an interest.

However, the inventors herein have recognized a number of issues with the above conventional methods of event distribution. Regarding the first conventional method of event distribution, the inventors have recognized that the method requires each subscriber to create and register one or more interfaces with each event producer, thereby placing a burden on event subscribers to be aware of each event producer, and to code separate interfaces for each event in which the subscriber has an interest. This makes scaling up the number of events to which a user is subscribed labor intensive, and error prone, as each new event subscription requires a new interface. Further, in cases where an event producer comprises a database including a plurality of data sets/data types, each subscriber interested in receiving events pertaining to the database may register an interface with the event producer, even if the subscriber is only interested in updates to a subset of the data contained within the database, and therefore a subscriber may receive events pertaining to data changes/updates to which the subscriber does not have an interest. Generally, because the method includes subscribers directly registering interfaces with event producers, unnecessary/excessive event producer/event subscriber coupling, and data exposure may result. Unnecessary coupling between event producers and consumers may be a significant burden for computing systems taking a dependency on a large number of events produced by a large number of event producers. Further, each event producer may use a different event format, which may need to be taken into account by the event subscriber, and may consume additional resources and/or add additional computational complexity.

Regarding the second conventional method of event distribution, the inventors herein have recognized that event distribution through subscriber subscription to one or more event channels/queues/topics, requires event producers to individually pipe events to each channel to which an event may correspond. Therefore, this method may require substantial work on the part of the event producer, especially in cases where the number of event channels/queues/topics is large, as the event producer may be required to format events differently for each event channel/queue/topic, and may need to include code for piping events to each distinct event channel/queue/topic. Thus, the second conventional method of event distribution may enable a subscriber to more easily subscribe to a generic class of events compared to the first conventional method, but it increases the burden on the event producer, by requiring the event producer to be aware of each event channel/queue/topic, and to individually pipe events to each event channel/queue/topic to which a produced event may correspond. Further, event channels/queues/topics are course grained (that is, they represent a generic category and are therefore limited in specificity), and subscribers interested in only a narrow subset of events corresponding to a given event channel/topic/queue may receive a significant number of events that do not fit the interests of the subscriber. As an example, an event subscriber interested in receiving basketball scores associated with a single basketball team, may subscribe to a basketball event channel/queue/topic, and may therefore receive not only scores related to the team of interest, but may receive scores associated with teams in which the subscriber is not interested. Thus, a limitation of the event channel method (the second conventional method) of event distribution is that event channels may be course grained, which may lead to event subscribers receiving events in which they are not interested, and attempting to mitigate this issue by increasing the specificity of the event channels/queues/topics may lead to a proliferation of the number of event channels, thereby leading to increased work on the part of the event producers, as the number of destinations to which event producers may need to pipe events may increase. Thus, the inventors herein have identified potential issues with both the first and the second conventional methods of event distribution, which may result in increased data exposure (which may compromise a security/privacy), unnecessary coupling between event subscribers and event producers, mismatch between subscriber interest and events routed to said subscriber, and computational inefficiency of event distribution.

The inventors herein have developed systems and methods which may at least partially mitigate the above identified issues. In a first example, a method comprising: receiving an event from an event producer at an endpoint of an event conduit, wherein the event comprises a plurality of key-value pairs; parsing the event into the plurality of key-value pairs; determining a truth value for each of a plurality of subscriber filters based on the plurality of key-value pairs and Boolean algebra, wherein each of the plurality of subscriber filters comprises a Boolean expression comprising one or more key-value pair relationships; adding a subscriber endpoint to a plurality of subscriber endpoints within an event distribution list, wherein the subscriber endpoint is linked with a subscriber filter of the plurality of subscriber filters, and wherein the subscriber filter has a determined truth value of true; and transmitting the event to the plurality of subscriber endpoints within the event distribution list. The above method may reduce unnecessary coupling between event subscribers and event producers, by enabling event producers to transmit events, and event subscribers to receive events, while coupled to an event conduit, and therefore without requiring event producers and subscribers to be directly coupled to each other. Likewise, by uncoupling event producers and event subscribers, data exposure may be decreased. Further, event producers may submit events to a single endpoint, instead of to a plurality of event channels/topics/queues or subscribers, reducing the need to code separate conditionals for a plurality of subscribers or event channels/queues/topics. Likewise, event subscribers may easily subscribe to as generic, or specific, a subset of events as they choose, by registering a subscriber filter comprising a Boolean expression comprising one or more key-value relationships with the event conduit, thereby mitigating the burden of coding individual interfaces for each event/event channel to which a subscriber has an interest. The subscriber filters registered with the event conduit, which comprise freeform Boolean expressions, may further enable an increase in event distribution efficiency by enabling each subscriber to register individual subscriber filters with the event conduit, thereby enabling subscribers to receive only those events which satisfy their associated subscriber filters. This may reduce the mismatch between events in which a subscriber is interested and events which a subscriber receives.

In a second example, event distribution efficiency may be increased by a method for an event conduit comprising: receiving a subscriber filter at an HTTP endpoint of the event conduit; receiving one or more subscriber endpoints associated with the subscriber filter; parsing the subscriber filter into a plurality of key-value relationships, wherein the plurality of key-value relationships are logically connected by a plurality of Boolean operators; receiving an event from a database, wherein the event comprises a plurality of key-value pairs; determining a plurality of truth values for the plurality of key-value relationships based on the plurality of key-value pairs; determining a truth value for the subscriber filter based on the plurality of truth values of the plurality of key-value relationships and further based on the plurality of Boolean operators; adding the one or more subscriber endpoints to an event distribution list responsive to the truth value being true; and distributing the event to the one or more subscriber endpoints. In this way, event distribution efficiency may be increased by determining a plurality of truth values for the plurality of key-value relationships based on the plurality of key-value pairs, determining a truth value for the subscriber filter based on the plurality of truth values of the plurality of key-value relationships and further based on the plurality of Boolean operators. By rapidly determining if a given event "matches" a subscriber filter (that is, the set of key-value pairs comprising the event causes the subscriber filter to have a truth value of true) by comparing the plurality of key-value pairs with the plurality of key-value relationships comprising the subscriber filter, processing time required to match a plurality of events to one or more of a plurality of event subscribers may be reduced, while simultaneously reducing the number of mismatched events received by a subscriber.

In a third example, one or more of the above identified issues may be at least partially mitigated by a server implementing an event conduit in communication with an event producer device and event subscriber device, the server comprising: a logic subsystem; a communication subsystem;

and a data-holding subsystem storing instructions executable by the logic subsystem to: receive a subscriber filter from the event subscriber device; parse the subscriber filter into a plurality of key-value relationships; receive an event from the event producer device, wherein the event comprises a plurality of key-value pairs; determine a truth value for the subscriber filter based on the plurality of key-value relationships and the plurality of key-value pairs; transmit the event to the subscriber device responsive to the truth value for the subscriber filter equaling true. In this way, an event produced by an event producer device may be efficiently distributed to one or more of a plurality of subscriber devices, based on the plurality of key-value pairs comprising the event satisfying a subscriber filter registered by one or more of the plurality of subscriber devices with the server implementing the event conduit. The plurality of key-value relationships comprising the subscriber filters may give subscribers greater control over which events are received by subscriber devices registered with the event conduit, as the key-value relationships may describe as broad or as narrow a range of events as desired by the subscriber devices by including more or less key-value relationships, or by changing the Boolean operators connecting the various key-value relationships comprising the filter. Further, because the subscriber filters comprise a plurality of key-value relationships, each of which may be evaluated independently, this may enable greater computational efficiency, especially in cases of large subscriber filters comprising many key-value relationships, as the complexity of evaluating if an event matches a given subscriber filter may increase linearly (as opposed to exponentially) with the number of key-value relationships.

The above summary is provided to introduce a selection of concepts in a simplified form that are further described below in the Detailed Description. This summary is not intended to identify key features or essential features of the subject matter, nor is it intended to be used to limit the scope of the subject matter. Furthermore, the subject matter is not limited to implementations that solve any or all of the disadvantages noted above or in any part of this disclosure.

BRIEF DESCRIPTION OF THE DRAWINGS

FIG. 6 shows an example of a table of free-form Boolean event filters, in accordance with an embodiment of the present disclosure.

FIG. 7 shows an example of an event, in accordance with an embodiment of the present disclosure.

FIG. 8 shows an example of an HTTP callback mechanism, in accordance with an embodiment of the present disclosure.

FIG. 9 shows an example of an SQS callback mechanism, in accordance with an embodiment of the present disclosure.

DETAILED DESCRIPTION

Figure 1:
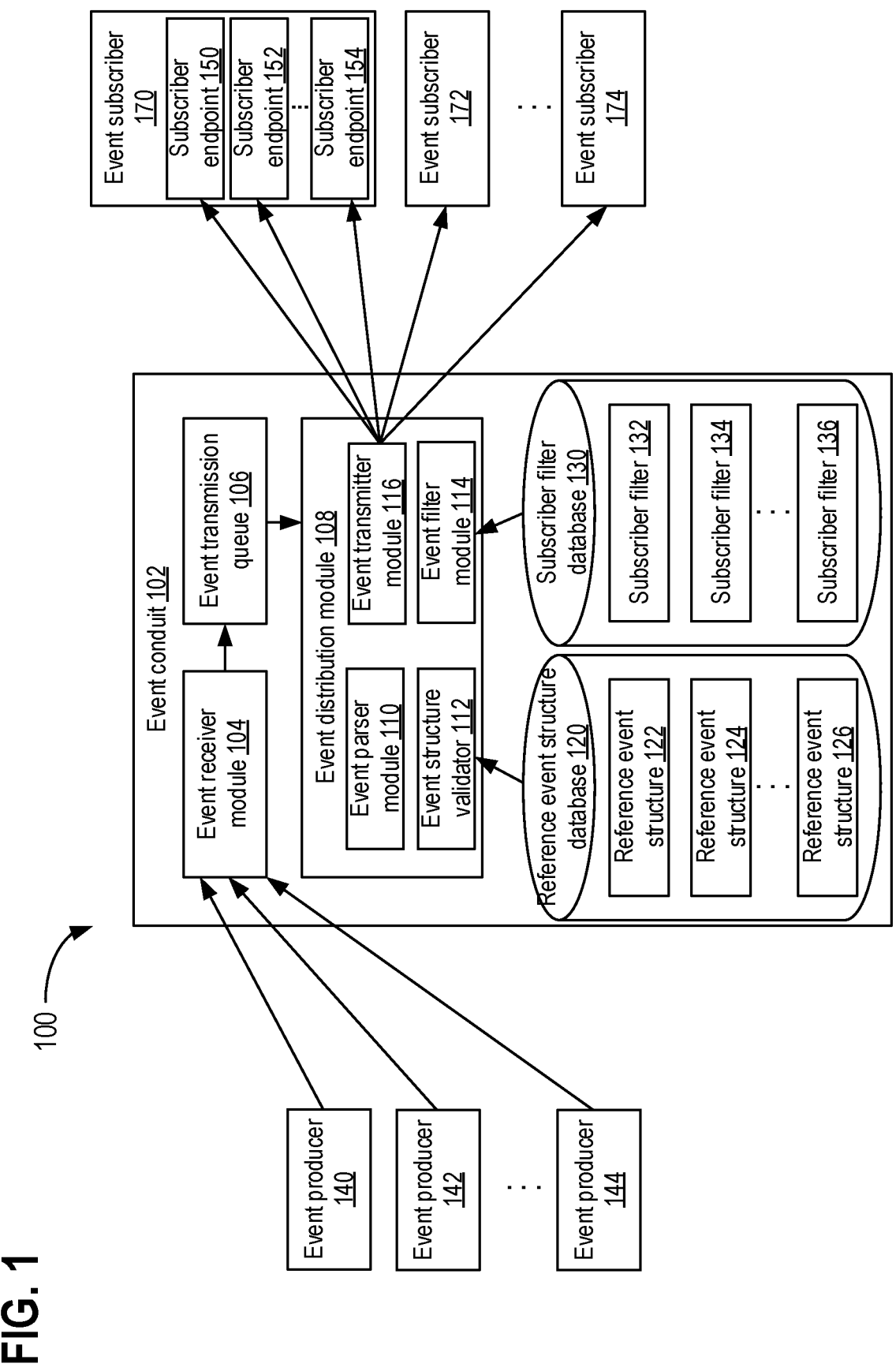
FIG. 1 shows a high level illustration of an example of a flexible event service, in accordance with an embodiment of the present disclosure.

The following description relates to systems and methods for a flexible event service. The flexible event service may accept/receive events produced by a plurality of event producers, determine to which of a plurality of subscriber endpoints the received events are to be transmitted based on comparison between the received event and the plurality of subscriber filters registered with the flexible event service, and distribute/transmit the events to the subscriber endpoints. The flexible event service may comprise an event conduit configured to receive events from a plurality of event producers, generate a distribution list comprising subscriber endpoints associated with subscriber filters matching the event, and transmit the event to the subscriber endpoints indicated by the event distribution list.

In one example, the events herein referred to may comprise a free collection of key-value pairs which may be representable in code as a dictionary of values, wherein each key has a single associated/corresponding value, as is understood in the art of data structures. As an example, events may be represented as a JSON blob in the communication protocol. Each event may have n key-value pairs, where n is a positive, non-zero, integer. The specific set of key-value pairs that each event comprises is herein defined as the structure of the event, and is herein also referred to as an event schema. Events may comprise general events, and specific events. The key-value pairs within general events may not conform to any set format or structure, and therefore subscribers registered to receive general events may be loose in their expectations of event structure. Contrastingly, specific events may conform to pre-specified standards, structure, or format, such that the set of key-value pairs comprising a specific event may be in a pre-determined order, or the key-value pairs may conform to the pre-determined format or structure. In the case of specific events, subscribers may expect more in terms of presence of certain keys, presence of valid values for certain keys etc. According to the current disclosure, specific event types may comprise an event-type key and an associated event-type ID, the event-type key and the event-type ID may be one of one or more key-value pairs included in the specific event. The event-type IDs included within specific event types may point or link to a reference event structure, the reference event structures may be stored in a reference event structure database or other storage medium or data structure, for rapid lookup by an event conduit for validation of event structure for events containing event type IDs. Reference event structures stored within a reference event structure database may, in one example, be indexed according to event-type ID, thereby enabling rapid query of reference event structures based on an event-type ID included within a received event. In one example, to identify that an event corresponds to a reference event structure (that is, that the structure of a received event matches the format/structure established for a pre-determined class of specific events such as may be stored in a reference event structure database accessible by the event conduit) the received event may include the event-type ID corresponding to the reference event structure in a well-known key in the event keys, such as in an event-type key. Inclusion of event-type keys and event-type IDs within specific event types may increase the efficiency of event distribution by increasing a speed of event structure validation, and may further enable subscribers to take specific actions, or process events in a specific way, based on the particular event-type ID included within the event. Further, inclusion of event-type IDs within events may enable faster matching between a received event and subscriber filters, as, in one example, a subscriber may indicate an event-type ID corresponding to a class of events in which the subscriber has an interest, which may enable matching of received events to said subscriber without first comparing each key-value pair within the received event to a plurality of key-value relationships included within a subscriber filter.

An event subscriber may register interest in a variety of events by specifying a filter expression and registering the filter with an event conduit. The subscriber may subscribe using a variety of reception endpoints (herein also referred to as subscriber endpoints, or callback mechanisms) such as HTTP, SQS, SNS etc. The subscriber specified filter (herein referred to as a subscriber filter, or Boolean filter) may be registered with an event conduit along with one or more endpoints indicating a digital address/location where the event is to be routed/transmitted upon the event structure matching the subscriber filter, wherein the subscriber filters comprise a plurality of key-value relationships connected via Boolean operators (and therefore the subscriber filter may also be referred to as a freeform Boolean expression). In one example, upon submission to an event conduit, a subscriber filter may be parsed into a plurality of key-value relationships, and stored in a subscriber filter database along with an associated subscriber ID linking (or indexing) the subscriber filter/key-value relationship with a subscriber and the one or more subscriber endpoints registered by the subscriber. The subscriber filters and/or key-value relationships comprising the subscriber filters, stored within the subscriber filter database, may therefore be rapidly queried by the event conduit to determine if an event received by the event conduit matches one or more of the subscriber filters stored therein. In another example, the one or more key-value relationships comprising a subscriber filter may be indexed according to key, thereby enabling rapid query of key-value relationships involving a given key and/or a value corresponding to a given key. Within the context of comparing an event with a subscriber filter, an event whose plurality of key-value pairs cause the overall Boolean expression of a subscriber filter to obtain (or equal) a truth value of true (wherein truth values are either true, or false, by definition), may be herein referred to as matching the subscriber filter, or satisfying the subscriber filter. For each event received, subscriber endpoints indexed with, or otherwise linked with, subscriber filters matching the event, may be added to an event distribution list for the received event. In one example, a subscriber filter indexed by subscriber ID may match an event received by the event conduit, the event conduit may then query a data structure, such as a database, to access endpoints associated with the subscriber ID, and said endpoints may be added to an event distribution list. Events may then be transmitted to each endpoint included within an event distribution list, wherein the order of transmission may be pre-defined by each subscriber, or may be based on a pre-determined order calculated by the event conduit, or the event may be transmitted to each endpoint within an event distribution list simultaneously, or based upon a calculation conducted immediately preceding event transmission. In one example, a new event distribution list may be generated for each event received by the event conduit. In another example, a series of a linked/associated events may each be distributed to subscriber endpoints included within a single event distribution list, such that the event distribution list may be generated based on the first received event, of the linked series of events, and the event distribution list may be reused for each of the subsequent events in the series.

Figure 2:
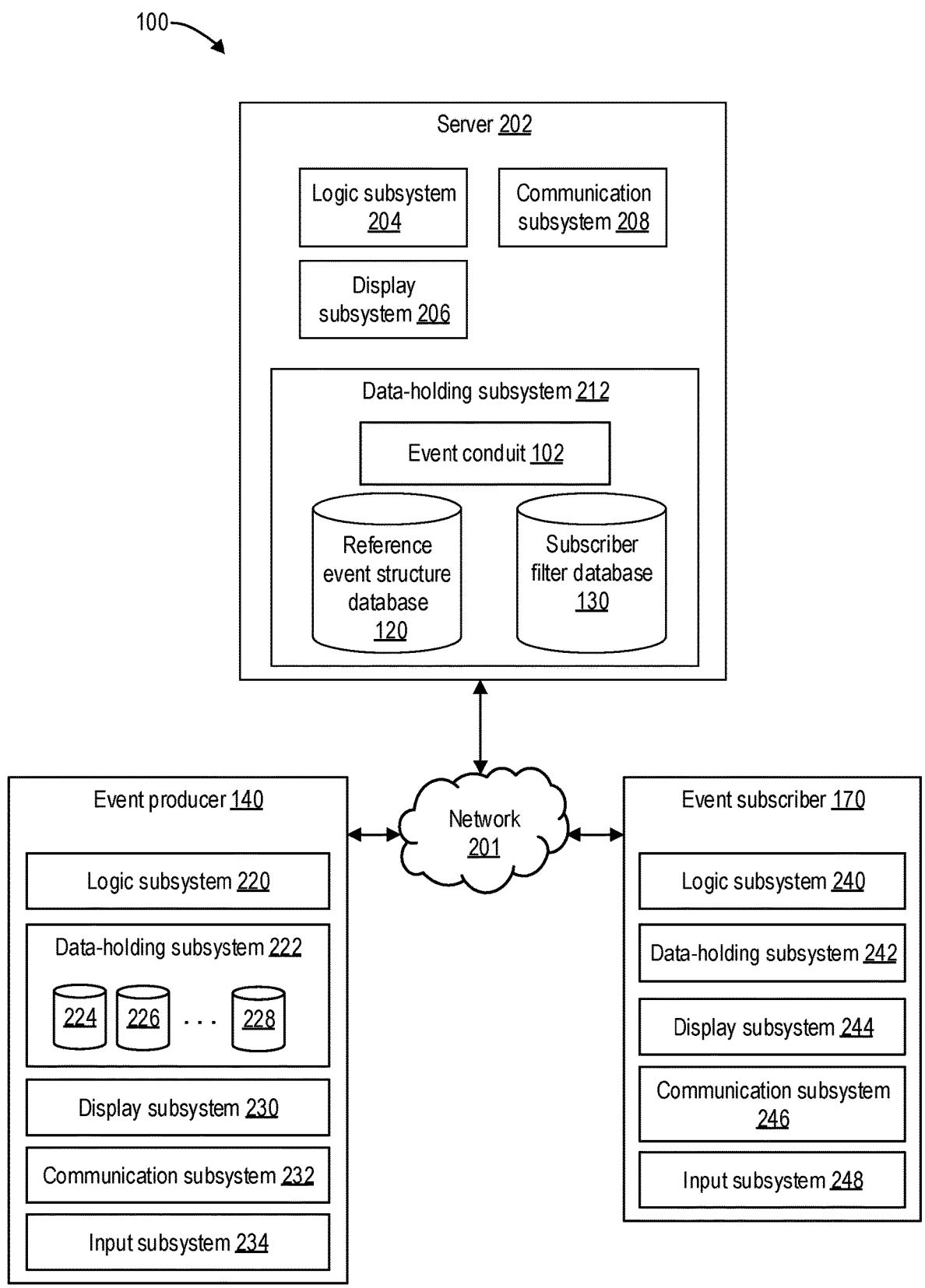
FIG. 2 shows an example of an event producer and an event subscriber communicatively coupled with a server implementing an event conduit, in accordance with an embodiment of the present disclosure.
Figure 3:
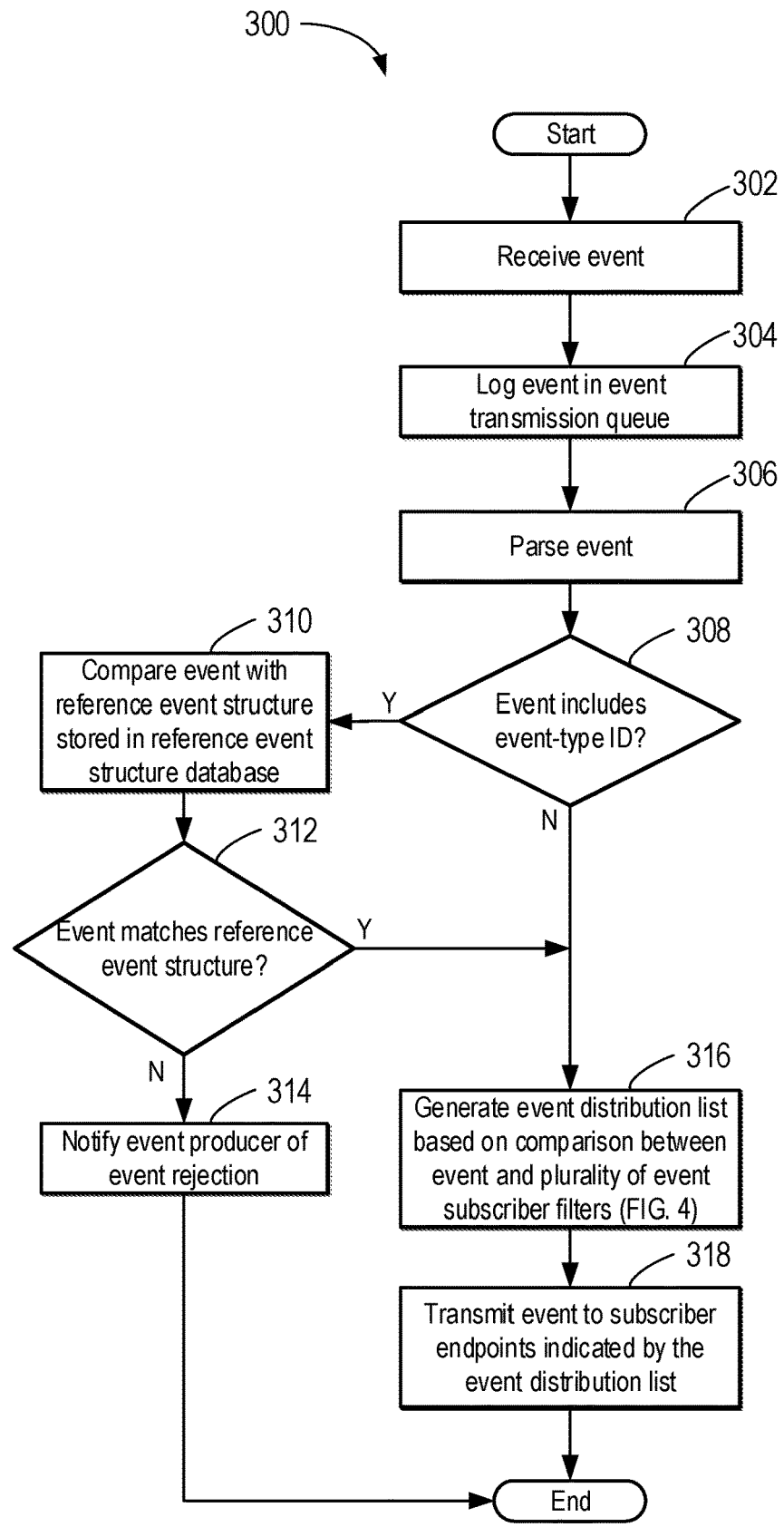
FIG. 3 shows a high level flowchart of an example method for distributing an event to a plurality of subscribers using an event conduit, in accordance with an embodiment of the present disclosure.
Figure 4:
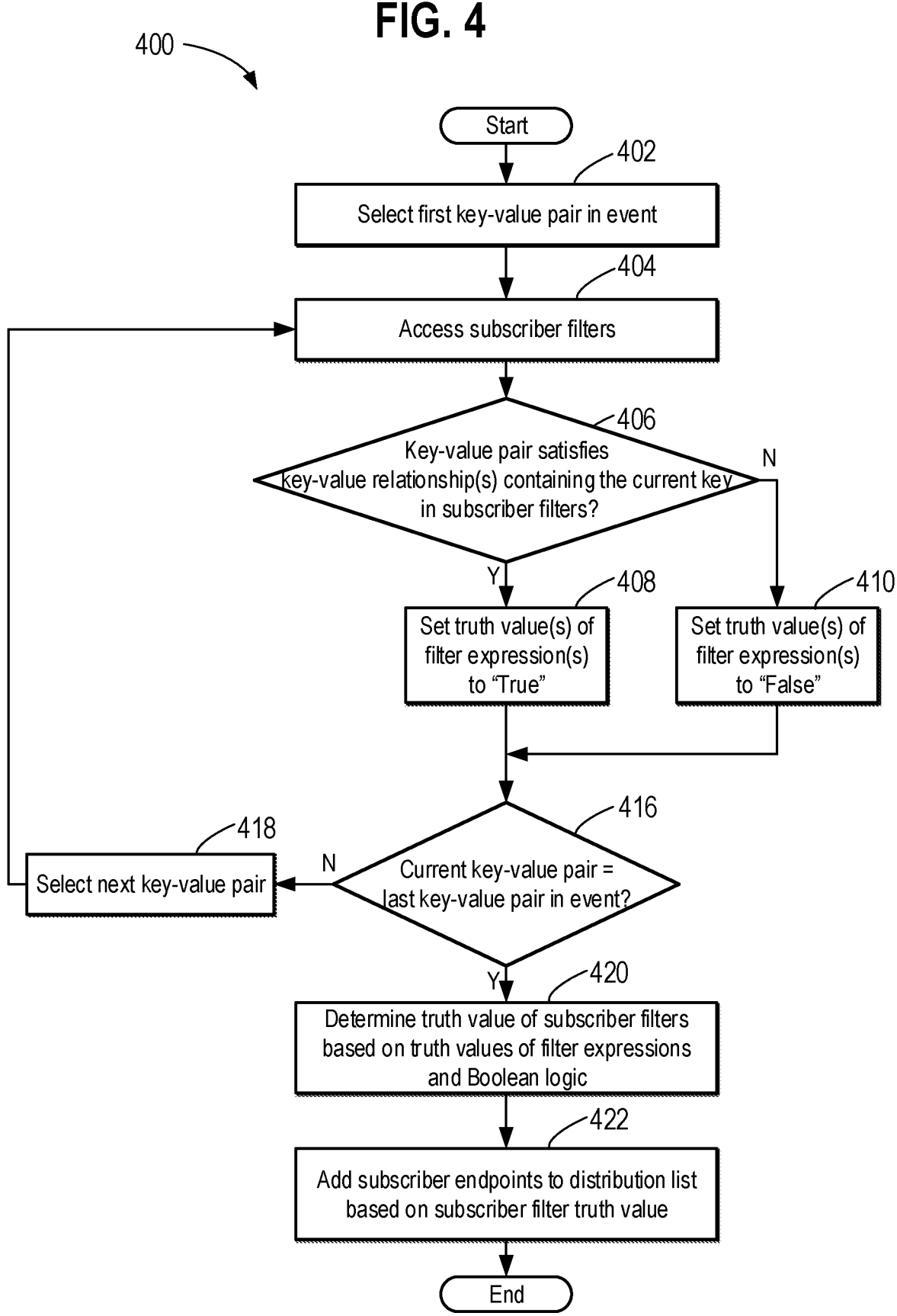
FIG. 4 shows a high level flowchart of an example method for generating an event distribution list by comparing a raised event to a plurality of subscriber filters registered with an event conduit, in accordance with an embodiment of the present disclosure.

FIGS. 1 and 2 illustrate exemplary embodiments of hardware which may implement the flexible event service, and which may carry out one or more steps of the methods herein disclosed. FIG. 1 illustrates a flexible event service 100 comprising a plurality of event producers (event prouder 140, event producer 142, and event producer 144), connected to an event conduit 102, wherein the event conduit 102 is communicatively coupled to a plurality of event subscribers (event subscriber 170, event subscriber 172, and event subscriber 174). FIG. 2 illustrates a flexible event service 200, wherein a server 202, implementing event conduit 102, is connected to an event producer device 260 and an event subscriber device 250, via network 201. Event conduits, such as those illustrated in FIGS. 1 and 2, may carry out one or more of the methods herein disclosed with reference to FIGS. 3, 4, and 5. FIG. 3 shows a high level flowchart of an example method for distributing an event to a plurality of subscribers using an event conduit, which may enable more efficient event distribution by generating an event distribution list based on a comparison between the plurality of key-value pairs comprising the event and the plurality of subscriber filters registered with the event conduit. FIG. 4 illustrates a high level flowchart of an example method for generating the event distribution list by comparing a plurality of key-value pairs comprising a received event with a plurality of key-value relationships corresponding to a plurality of subscriber filters, wherein the plurality of key-value relationships are stored within a subscriber filter database of an event conduit. The method of FIG. 4 includes steps for evaluating the truth value of each of the plurality of key-value relationships comprising the event filter, and based on the determined truth values, determining a truth value for the subscriber filter using Boolean algebra. This method of filter evaluation may enable reduced computational complexity, thereby enabling a decrease in event processing time and/or reduced consumption of computational resources. According to an embodiment of the current disclosure, subscriber filters may be registered with an event conduit by transmitting a freeform Boolean event filter, along with associated endpoints/callback mechanisms, according to a method, such as method 500 of FIG. 5, wherein subscriber filters received by the event conduit may be parsed into a plurality of key-value relationships, and each key-value relationship may be stored separately in a subscriber filter database. FIG. 6 shows one example of a table of parsed key-value relationships, which may comprise subscriber event filters, and which may be stored in an event filter database. FIG. 7 shows one example of an event, comprising a python dictionary, such as may be received by an event conduit at an endpoint, and distributed to a plurality of event subscribers in accordance with one or more steps of one or more of the methods herein disclosed. FIGS. 8 and 9 shows an example of callback mechanism which may be registered with an event conduit by an event subscriber in accordance with an embodiment of the present disclosure. FIG. 9 shows an example of an SQS callback mechanism, in accordance with an embodiment of the present disclosure.

Turning first to FIG. 1, a high level block diagram of an exemplary embodiment of a flexible event service 100 is shown. Flexible event service 100 may enable event producers to efficiently distribute events to a plurality of event subscribers by submitting events to an event conduit, the event conduit then receives and processes the event, before distributing the event amongst a plurality of subscribers based on subscriber interest indicated by subscriber filters registered with the event conduit. Thus, flexible event service 100 may enable event producers to efficiently distribute events to event subscribers with a low degree of mismatch (that is, with a low probability of a subscriber receiving an event which the subscriber is not interested in) without requiring the event producers to account for, and pipe events to, a plurality of channels, subscribers, and/or endpoints, as, in one example, the event conduit 102 may receive a plurality of events from a plurality of event producers at a single endpoint. Thus, a flexible event service 100 may enable event producers to accurately and rapidly distribute an event to a plurality of subscribers by submitting events to a single endpoint of an event conduit, as opposed to a plurality of endpoints associated with a plurality subscribers/channels/queues/topics, thereby streamlining the event distribution process from the perspective of the event producers. Likewise, flexible event service 100 may enable event subscribers to receive a plurality of events, of a wide variety, from a plurality of event producers, by subscription to a single event conduit, as opposed to subscribing to a plurality of event producers/channels/queues/topics. Thus, flexible event service 100 may streamline the process of event distribution both from the perspective of the event producers, as well as from the perspective of the event subscribers. Further, distributing events to event subscribers whose subscriber filter may be stored in a fast queryable subscriber filter database 130 of the event conduit 102, may enable faster and more accurate distribution of events to those subscribers with an active interest in the event.

Flexible event service 100 comprises a plurality of event producers (event producer 140, event producer 142, and event producer 144) communicatively coupled to event conduit 102. Event conduit 102 and the plurality of event producers may be communicatively coupled by any method known in the art of computing devices, such as through a network connection (e.g. the Internet), a cellular connection, a local area network, a USB connection, or other connection, enabling exchange of information between computing devices. As used herein, communicatively coupled may have the definition as given in the preceding sentence, that being, any method or means of connecting computing systems which enables exchange of data/information. Although three event producers are shown in FIG. 1, it will be appreciated the current disclosure provides for any number of event producers may be communicatively coupled to event conduit 102. Flexible event service 100 further comprises a plurality of event subscribers (event subscriber 170, event subscriber 172, and event subscriber 174) communicatively coupled to event conduit 102, thereby enabling transmission of events from event conduit 102 to one or more of the plurality of event subscribers. Although three event subscribers are shown in FIG. 1, it will be appreciated that any number of event subscribers may be communicatively coupled to event conduit 102, and may thereby register with the event conduit 102 to receive events corresponding to subscriber filters specified and submitted to the event conduit 102 by one or more of the plurality of event sub scribers.

Event producers, such as event producer 140, event producer 142, and event producer 144, may comprise any computing system, database, folder, module, sensor, website, or other system capable of producing and transmitting events. It will be appreciated that, although shown separately, an event producer and an event subscriber may be one and the same device, as in some instances a computing device may both produce events and subscribe to receive events. In one example, an event producer may comprise a healthcare database, wherein a plurality of healthcare data is stored. Updates or changes made to the healthcare database may trigger transmission of an event associated with the change to an event conduit, such as event conduit 102. In another example, events may be transmitted to event conduit 102 periodically, according to a pre-defined schedule. In yet another example, events may be transmitted to event conduit 102 upon a pre-specified condition being met.

Event conduit 102 may be implemented by one or more computing systems, and may comprise one or more modules, subsystems, and/or subroutines for performing one or more functions related to receiving, processing, filtering, validating, and distributing events. Event conduit 102 may be configured to execute one or more steps of one or more of the methods herein disclosed. Although shown in FIG. 1 as a single system, event conduit 102 may be implemented by a plurality of computing systems working in concert, such as through a network. In one example, the functionality of event conduit 102 may be exposed via JSON over HTTP REST endpoints, such that events, subscriber filters, subscriber endpoints, and other information, may be transmitted to event conduit 102 by specifying a unique HTTP REST endpoint corresponding to the event conduit 102.

Event conduit 102 may comprise an event receiver module, such as event receiver module 104. Events transmitted to event conduit 102 may be received by event receiver module 104. In one example, event receiver 104 may be configured to receive events and/or other data transmitted to an HTTP REST endpoint of the event conduit 102. Event receiver module 104 may be configured to receive, and log into non-transitory memory, events transmitted to event conduit 102. In one example, event receiver module 104 may be configured to receive an event, verify that the received event comprises a plurality of key-value pairs, time stamp the received event, and log/store the received event in non-transitory memory, such as in event transmission queue 106. Although shown in FIG. 1 as a single system, it will be appreciate that the current disclosure provides for a plurality of event receiver modules, and further, that the event receiver module 104 may be implemented by one or more computing systems or devices, working in concert, or working in parallel.

Event conduit 102 may comprise an event transmission queue, such as event transmission queue 106. Event transmission queue 106 may be configured as a temporary repository for events which have been received and logged by event receiver module 104. Event transmission queue 106 may enable event conduit 102 to mitigate situations in which events are transmitted to event conduit 102 faster than events are distributed by event conduit 102 to event subscribers, without overwhelming the various downstream components/modules of the event conduit 102 responsible for processing and distributing received events. Event transmission queue 106 may temporarily store received events until downstream modules are available to process and distribute additional events. Although shown in FIG. 1 as a single system, it will be appreciate that the current disclosure provides for a plurality of event transmission queues, and further, that the event transmission queue 106 may be implemented by one or more computing systems or devices, working in concert, or working in parallel.

Event conduit 102 may comprise an event distribution module 108, which may be configured to select events logged in event transmission queue 106 for processing and distribution. In one example, event distribution module 108 may select an event for processing and distribution from event transmission queue 106 based on a time-stamp of the event, such as accordance with a first in first out method of processing. In another example, event distribution module 108 may select an event from event transmission queue 106 based on the event-type, such that events of a higher time sensitivity may be selected first, regardless of the time at which the event was logged or received. Event distribution module 108 may comprise one or more sub-modules, such as those discussed in more detail below, which may perform one or more steps associated with parsing, performing structure validation for events containing event-type IDs, generating event distribution lists based on the received event matching freeform Boolean subscriber filters, and/or transmitting the event to subscriber endpoints. Although shown in FIG. 1 as a single system, it will be appreciate that the current disclosure provides for a plurality of event distribution modules, and further, that the event distribution module 108 may be implemented by one or more computing systems or devices, working in concert, or working in parallel.

Event distribution module 108 may comprise an event parser module, such as event parser module 110. Event parser module 110 may be configured to receive an event from event transmission queue 106, and parse the event into the plurality of key-value pairs comprising the event. Event parser module 110 may parse events by one or more conventional methods of data parsing known in the art of data processing. For example, event parser module 110 may parse events into key-value pairs by identifying occurrence of delimiter characters, such as quotation marks, or other marks arbitrarily pre-specified as delimiter characters, which may delimit where a given key, and corresponding value, start and stop. Although shown in FIG. 1 as a single system, it will be appreciate that the current disclosure provides for a plurality of event parser modules, and further, that the event parser module 110 may be implemented by one or more computing systems or devices, working in concert, or working in parallel.

Event distribution module 108 may further comprise an event structure validator 112. Event structure validator 112 may be configured to receive a parsed event (that is, a plurality of key-value pairs corresponding to a single event) from event parser 110, determine if the parsed event includes a key-value pair comprising an event-type key and an associated event-type ID, and based upon the parsed event including an event-type ID, query the reference event structure database 120 for a reference event structure indexed with an event-type ID matching the event-type ID included within the parsed event. The event structure validator 112 may be further configured to compare each of the plurality of key-value pairs of the parsed event with the reference event structure obtained from the reference event structure database 120, to determine if the received event matches the format/structure of the reference event structure. In one example, if one or more of the plurality of key-value pairs of the parsed event exceed a range indicated by the reference event structure, or alternatively, if one or more of the key-value pairs of the parsed event fails to match a format indicated by the reference event structure, event structure validator 112 may be configured to modify the parsed event, such as by removing the event-type key and event-type ID, thereby reducing the probability that a subscriber may erroneously take a dependency on the basis that the event conforms to an event structure associated with the event-type ID. Although shown in FIG. 1 as a single system, it will be appreciate that the current disclosure provides for a plurality of event structure validators, and further, that the event structure validator 112 may be implemented by one or more computing systems or devices, working in concert, or working in parallel.

Event distribution module 108 may further comprise an event filter module 114. Event filter module 114 may be configured to receive events from event structure validator 112, and to compare the event with a plurality of subscriber filters within subscriber filter database 130 to determine which subscriber filters match the event (discussed in more detail below with regards to method 400 of FIG. 4). For each event filter which matches the event, event filter module 114 may add one or more subscriber endpoints associated with the matching subscriber filter to an event distribution list. Event filter module 114 may be further configured to transmit distribution lists and the events which the event distribution lists were based upon to event transmitter module 116 for distribution to the plurality of subscriber endpoints included within the event distribution lists. Although shown in FIG. 1 as a single system, it will be appreciate that the current disclosure provides for a plurality of event filter modules, and further, that the event filter module 114 may be implemented by one or more computing systems or devices, working in concert, or working in parallel.

Event distribution module 108 may further comprise an event transmitting module, such as event transmitter module 116. Event transmitter module 116 may be configured to store a plurality of endpoints/callback mechanisms specified by one or more event subscribers during a registration process, such as that discussed in more detail below with reference to method 500. Event transmitter module 116 may, in one example, receive an event distribution list from event filter module 114, and may further include instructions stored in non-transitory memory for determining an order of distribution of the event amongst the plurality of subscriber endpoints indicated by the event distribution list. In one example, event transmitter module 116 may distribute an event amongst subscriber endpoints indicated/included within the event distribution list according to a pre-determined order wherein the pre-determined order may be specified by even subscribers. In one example, an event subscriber with a plurality of registered endpoints, may specify an order of distribution of an event amongst the plurality of endpoints, and this order may be stored in non-transitory memory of an event transmitter module, such as in event transmitter module 116. In another example, event transmitter module 116 may transmit an event to a plurality of subscriber endpoints simultaneously. In yet another example, event transmitter module 116 may determine an order of distribution for an event amongst a plurality of subscriber endpoints included within an event distribution list at a time immediately prior to event distribution, based on a GPS location associated with each of the plurality of subscriber endpoints. Although shown in FIG. 1 as a single system, it will be appreciate that the current disclosure provides for a plurality of event transmitter modules, and further, that the event transmitter module 116 may be implemented by one or more computing systems or devices, working in concert, or working in parallel.

Event conduit 102 may further comprises reference event structure database 120. Reference event structure database 120 may comprise a plurality of reference event structures, such as reference event structure 122, reference event structure 124, and reference event structure 126. Although three reference event structures are shown in the flexible event service 100 of FIG. 1, it will be appreciated that the current disclosure provides for any number reference event structures to be stored within reference event structure database 120. In one example, reference event structures stored within reference event structure database 120 may be indexed according to event-type ID. That is, each event-structure may be stored within an entry in reference event structure database 120 along with a unique identification number, or alpha-numeric id, which, when included within an event received by event conduit 102, enables rapid query of a reference structure within the reference event structure database 120 corresponding to the event-type ID. Reference event structure database 120 may exchange information with event structure validator 112, to enable event structure validator 112 to query reference event structures stored within reference event structure database 120 for comparison with a received event, wherein the received event comprises an event-type key and an event-type ID, and wherein the reference event structure retrieved by the event structure validator 112 is indexed by the event-type ID included within the received event. Reference event structures within reference event structure database 120 may comprise pre-defined key-value pairs associated with a specific event type. Reference event structures may further comprise indications of ranges/tolerances for key-value pairs, such that an event whose plurality of key-value pairs fall within the bounds of the indicated ranges/tolerances may be considered to fit, or match, the reference event structure. Although shown in FIG. 1 as a single unit, it will be appreciate that the current disclosure provides for a plurality of reference event structure databases, and further, that the reference event structure database 120 may be implemented by one or more computing systems or devices, working in concert, or working in parallel.

Event conduit 102 may further comprise subscriber filter database 130. Subscriber filter database 130 may comprise a plurality of subscriber filters, such as subscriber filter 132, subscriber filter 134, and subscriber filter 136. In one example, each subscriber filter stored within subscriber filter database 130 may be unique. In another example, one or more subscriber filters within subscriber filter database 130 may be equivalent. Although three subscriber filters are shown in the flexible event service 100 of FIG. 1, it will be appreciated that the current disclosure provides for any number subscriber filters to be stored within subscriber filter database 130. In one example, subscriber filters stored within subscriber filter database 130 may be indexed according to subscriber ID. That is, each subscriber filter may be stored within an entry in subscriber filter database 130 along with a unique identification number, or alpha-numeric id, which corresponds to (that is, is uniquely associated with) a subscriber, which may enable rapid lookup of a subscriber's subscriber filter, for determining if an event received by event conduit 102 matches the subscriber filter, or conversely, based on a filter matching a received event, rapidly querying subscriber endpoints associated with the subscriber ID indexed with the matched subscriber filter. Subscriber filter database 130 may exchange information with event filter module 114, to enable the event filter module 114 to rapidly generate an event distribution list including subscriber endpoints associated or linked with one or more, or each, of the subscriber filters stored within subscriber filter database 130 that match the received event (a subscriber filter which matches an event is herein used to refer to a filter whose freeform Boolean expression results in a truth value of true when the plurality of key-value pairs comprising the received event are inserted into the terms of the plurality of key-value relationships comprising the subscriber filter). Subscriber filters within subscriber filter database 130, may comprise a plurality of key-value relationships coupled/connected/logically interrelated using one or more Boolean operators. The subscriber filters may be registered with event conduit 102 by one or more event subscribers, such as event subscriber 170, by transmitting the subscriber filter to an endpoint of event conduit 102. Although shown in FIG. 1 as a single unit, it will be appreciate that the current disclosure provides for a plurality of subscriber filter databases, and further, that the subscriber filter database 130 may be implemented by one or more computing systems or devices, working in concert, or working in parallel.

Flexible event service 100 may further comprise a plurality of event subscribers, such as event subscriber 170, event subscriber 172, and event subscriber 174. In one example, an event subscriber may comprise one or more computing devices and/or one or more subscriber endpoints/callback mechanisms. In one example, each event subscriber is assigned a unique subscriber ID upon registering/subscribing with event conduit 102, and each of a plurality of subscriber endpoints/callback mechanisms and devices associated with one or more of the plurality of subscriber endpoints/callback mechanisms may be associated with the subscriber ID. In one example, subscriber IDs may comprise alpha-numeric IDs. Event conduit 102 may index subscriber filters and subscriber endpoints/callback mechanisms by the unique event subscriber ID determined at the time of subscriber registration/subscription, thus enabling rapid lookup/query of subscriber filters, or subscriber endpoints, corresponding to a given subscriber. That is, a subscriber may comprise a single computing system and/or endpoint registered with event conduit 102, or alternatively, a subscriber may comprise a plurality of distinct computing systems and/or a plurality of subscriber endpoints/callback mechanisms. As shown in FIG. 1, event subscriber 170 comprises subscriber endpoint 150, subscriber endpoint 152, and subscriber endpoint 154. It will be appreciated that, the current disclosure provides for one or more, or each, of the plurality of event subscribers registered with the event conduit 102 to comprise any positive, non-zero number of endpoints/callback mechanisms. Although FIG. 1 shows three event subscribers, it will be appreciated that the current disclosure provides for a plurality of event subscribers. Subscriber endpoints may comprise digital addresses to which events may be transmitted. In one example, a subscriber endpoint may comprise an HTTP endpoint. In another example, a subscriber endpoint may comprise an SMS address or email address. In yet another example, a subscriber endpoint may correspond to a computing device.

Thus, flexible event service 100 comprises a plurality of event producers, and a plurality of event subscribers, coupled by event conduit 102. The event conduit 102 may receive a variety of events and event types from event producers, and distribute said events to event subscribers based on event subscriber interests expressed in the form of subscriber filters. Event conduit 102 may be configured to receive event subscriber specified filters (subscriber filters), which it may parse and store within a subscriber filter database, wherein the subscriber filters may comprise a plurality of key-value relationships related by Boolean operators. In this way, an event conduit, such as event conduit 102, may enable an increase event distribution efficiency by matching received events to event subscribers by rapidly querying and comparing the structure of a received event with a subscriber filter previously registered with the event conduit.

Turning now to FIG. 2, therein is shown another example of the flexible event service 100 shown in FIG. 1. As such, components of the flexible event service 100 already described in FIG. 1, may not be described again in detail in the description herein of FIG. 2. Specifically, FIG. 2 shows components of event producer 140, and event subscriber 172, in more detail. Further, FIG. 2 illustrates one example of a computing system/server which may implement event conduit 102.

FIG. 2 is a high level block diagram illustrating the flexible event service 100 suitable for the receiving, processing, and distributing events. In particular, flexible event service 100 as shown in FIG. 2, includes server 202, event subscriber 170 (herein also referred to as a subscriber device, or subscriber computing system), and event producer 140 (herein also referred to as an event producer device, or an event producer computing system). However, not all of the components illustrated may be required to practice the invention. Variations in the arrangement and type of the components may be made without departing from the spirit or scope of the invention.

FIG. 2 serves to emphasize various hardware components of the various computing systems which may interact as part of a flexible event service according to the current disclosure. For simplicity, FIG. 2 shows a single server 202 implementing event conduit 102 interacting with a single event producer 140 and a single event subscriber 170, via network 201, however it will be appreciated that the current disclosure provides for any number of computing systems/servers/event producer devices/event subscriber devices/modules, and that a plurality of computing systems, working in parallel, or in concert, may implement event conduit 102, or may comprise event producer 140 and/or event subscriber 170.

Server 202 may be a computing device/system configured to receive a subscriber filter from event an event subscriber, parse the subscriber filter into a plurality of key-value relationships, receive an event from the event producer, wherein the event comprises a plurality of key-value pairs, determine a truth value for the subscriber filter based on the plurality of key-value relationships and the plurality of key-value pairs, and transmit the event to the subscriber responsive to the truth value for the subscriber filter equaling true. In different embodiments, server 202 may take the form of a mainframe computer, server computer, desktop computer, laptop computer, tablet computer, network computing device, mobile computing device, mobile communication device, etc.

Server 202 may include a logic subsystem 204 and a data-holding subsystem 212. Server 202 may optionally include a display subsystem 206, communication subsystem 208, and/or other components not shown in FIG. 2. For example, server 202 may also optionally include user input devices such as keyboards, mice, game controllers, cameras, microphones, and/or touch screens.

Logic subsystem 204 may include one or more physical devices configured to execute one or more instructions. For example, logic subsystem 204 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 204 may include one or more processors that are configured to execute software instructions. Additionally or alternatively, the logic subsystem 204 may include one or more hardware or firmware logic machines configured to execute hardware or firmware instructions. Processors of the logic subsystem 204 may be single or multi-core, and the programs executed thereon may be configured for parallel or distributed processing. The logic subsystem 204 may optionally include individual components that are distributed throughout two or more devices, which may be remotely located and/or configured for coordinated processing. For example, the logic subsystem 204 may include several engines for processing and analyzing data. These engines may include subscriber filter evaluation engines, subscriber filter parsing engines, event distribution engines, event transmission engines, etc. These engines may be wirelessly connected to one or more databases, such as reference event structure database 120 and/or subscriber filter database 130 for processing data from the databases. One or more aspects of the logic subsystem 204 may be virtualized and executed by remotely accessible networked computing devices configured in a cloud computing configuration.

Data-holding subsystem 212 may include one or more physical, non-transitory devices configured to hold data and/or instructions executable by the logic subsystem 204 to implement the herein described methods and processes. When such methods and processes are implemented, the state of data-holding subsystem 212 may be transformed (for example, to hold different data). For example, the data-holding subsystem 212 may comprise the reference event structure database 120 and/or subscriber filter database 130 along with instructions/modules/data structures/subroutines included within event conduit 102. Thus, the data-holding subsystem 212 may include non-transitory memory with computer readable instructions for receiving events from event producer 140, and for filtering and transmitting the received events to event subscriber 172 based upon the received event matching a subscriber filter associated with event subscriber 172. Further, the data-holding subsystem 212 may include non-transitory data relating to one or more logged/received events, reference event structures, pre-specified orders of event transmission, subscriber IDs, event-type IDs, and subscriber filters. As such, the state of the subscriber filter database 130 and/or reference event structure database 120 may be transformed as new subscribers register with event conduit 102 by submitting new subscriber filters and subscriber endpoints.

Data-holding subsystem 212 may include removable media and/or built-in devices. Data-holding subsystem 212 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 212 may include devices with one or more of the following characteristics: volatile, nonvolatile, dynamic, static, read/write, read-only, random access, sequential access, location addressable, file addressable, and content addressable. In some embodiments, logic subsystem 204 and data-holding subsystem 212 may be integrated into one or more common devices, such as an application-specific integrated circuit or a system on a chip.

It is to be appreciated that data-holding subsystem 212 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 206 may be used to present a visual representation of data held by data-holding subsystem 212. As the herein described methods and processes change the data held by the data-holding subsystem 212, and thus transform the state of the data-holding subsystem 212, the state of display subsystem 206 may likewise be transformed to visually represent changes in the underlying data. Display subsystem 206 may include one or more display devices utilizing virtually any type of technology. Such display devices may be combined with logic subsystem 204 and/or data-holding subsystem 212 in a shared enclosure, or such display devices may be peripheral display devices.

When included, communication subsystem 208 may be configured to communicatively couple server 202 with one or more other computing devices, such as event producer device 140, and/or event subscriber device 172. Communication subsystem 208 may include wired and/or wireless communication devices compatible with one or more different communication protocols. As non-limiting examples, communication subsystem 208 may be configured for communication via a wireless telephone network, a wireless local area network, a wired local area network, a wireless wide area network, a wired wide area network, etc. In some embodiments, communication subsystem 208 may allow server 202 to send and/or receive messages/events to and/or from other devices via a network such as the public Internet. For example, communication subsystem 208 may communicatively couple server 202 with event producer device 140 and event subscriber 172 via network 201. In some examples, network 201 may be the public Internet.

Event producer 140 and event subscriber 172 may include logic subsystems 220, and 240, respectively, and data-holding subsystems 222, and 242, respectively. Event producer 140 and event subscriber 172 may optionally include display subsystems 230, and 244, respectively, and/or communication subsystems 232, and 246, respectively, and/or input subsystems 234, and 248, respectively, and/or other components not shown in FIG. 2.

Logic subsystems 220, and 240 may include one or more physical devices configured to execute one or more instructions. For example, logic subsystems 220, and 240 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystems 220, and 240 may include one or more processors that are configured to execute software instructions. Additionally or alternatively, the logic subsystems 220, and 240 may include one or more hardware or firmware logic machines configured to execute hardware or firmware instructions. Processors of the logic subsystems 220, and 240 may be single or multi-core, and the programs executed thereon may be configured for parallel or distributed processing. The logic subsystems 220, and 240 may optionally include individual components that are distributed throughout two or more devices, which may be remotely located and/or configured for coordinated processing. One or more aspects of the logic subsystems 220, and 240 may be virtualized and executed by remotely accessible networking computing devices configured in a cloud computing configuration.

Data-holding subsystems 222, and 242 may include one or more physical, non-transitory devices configured to hold data and/or instructions executable by the logic subsystems 220, and 240 to implement the herein described methods and processes. When such methods and processes are implemented, the state of data-holding subsystems 222 and 242 may be transformed (for example, to hold different data). Data holding subsystem 222, which is included within event producer 140, may include a plurality of databases, such as database 224, database 226, and database 228. Although three databases are shown included within data-holding subsystem 222, it will be appreciated that the current disclosure provides for any number of databases being included within data-holding subsystems, of event producers, or of other computing devices herein disclosed. Databases 224, 226, and 228, may comprise any known database structure, and may comprise a plurality of data types and data structures. In one example, one or more of the databases within data-holding subsystem 222 may comprise a healthcare database, and as such, may include data related to a plurality of patients, a plurality of medical procedures, a plurality of billing statements, a plurality of medical charts, a plurality of cost estimates, a plurality of healthcare outcomes, and/or other healthcare data. Logic subsystem 220 may access one or more of database 224, 226, and 228 to update, change, modify, reformat, or otherwise transform the data within one or more of said databases. Said transformation of data within one or more of database 224, 226, and/or 228 may be reported to a plurality of subscribers, by generating an event containing information pertinent to the transformation, and transmitting the event to an event conduit, wherein the event may be rapidly distributed to a plurality of interested subscribers.

Data-holding subsystems 222, and/or 242 may include removable media and/or built-in devices. Data-holding subsystems 222, and/or 242 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystems 222, and/or 242 may include devices with one or more of the following characteristics: volatile, nonvolatile, dynamic, static, read/write, read-only, random access, sequential access, location addressable, file addressable, and content addressable. In some embodiments, logic subsystems 220, and 240 and data-holding subsystems 222, and 242 may be integrated into one or more common devices, such as an application-specific integrated circuit or a system on a chip.

When included, display subsystems 230 and/and 244 may be used to present a visual representation of data held by data-holding subsystems 222 and/or 242. As the herein described methods and processes change the data held by the data-holding subsystems 222 and/or 242, and thus transform the state of the data-holding subsystems 222 and/or 242 the state of display subsystems 230 and/or 244 may likewise be transformed to visually represent changes in the underlying data. Display subsystems 230 and/or 244 may include one or more display devices utilizing virtually any type of technology. Such display devices may be combined with logic subsystems 220, and 240 and/or data-holding subsystems 222, and 242 in a shared enclosure, or such display devices may be peripheral display devices. Thus, display subsystems 230 and/or 244 may present a visual representation of an event, a subscriber registration interface, an event submission interface, or other data or interface.

When included, communication subsystems 232, and 246 may be configured to communicatively couple event producer 140, and event subscriber 172 with one or more of the other computing devices on the network 201. Communication subsystems 232, and 246 may include wired and/or wireless communication devices compatible with one or more different communication protocols. As non-limiting examples, communication subsystems 232, and 246 may be configured for communication via a wireless telephone network, a wireless local area network, a wired local area network, a wireless wide area network, a wired wide area network, etc. In some embodiments, communication subsystems 232, and 246 may allow event producer 140 and event subscriber 172 to send and/or receive messages and/or events to and/or from the other devices, as well as server 202 via network 201 such as the public Internet.

When included, input subsystems 234 and 248 may be configured to receive user gestures, keystrokes, swipes, presses, or other user actions or gestures, and map the gesture to data, and or manipulate pre-existing data based on the gesture/action. Input subsystems 234 and 248 may comprise keyboards, mice, touch-screens, motion sensors, game controllers, facial recognition devices, cameras, microphones, and/or other devices which may enable a user to input and/or manipulate data stored within one or more computing systems/devices. In one example, input subsystem 248 may enable a subscriber to specify and register one or more subscriber endpoints and/or subscriber filters, with an event conduit, to receive events from the event conduit at the specified and registered subscriber endpoints, responsive to the events matching the specified and registered subscriber filter.

Thus server 202, and event producer 140 and event subscriber 172 may comprise computing devices which may generally include any device that is configured to perform computation and that is capable of sending and receiving data communications by way of one or more wired and/or wireless communication interfaces. Such devices may be configured to communicate using any of a variety of network protocols. For example, event producer 140, and event subscriber 172, may be configured to execute a browser application that employs HTTP to request and/or submit, information to/from server 202 and then display the retrieved information to a user on a display.

Figure 5:
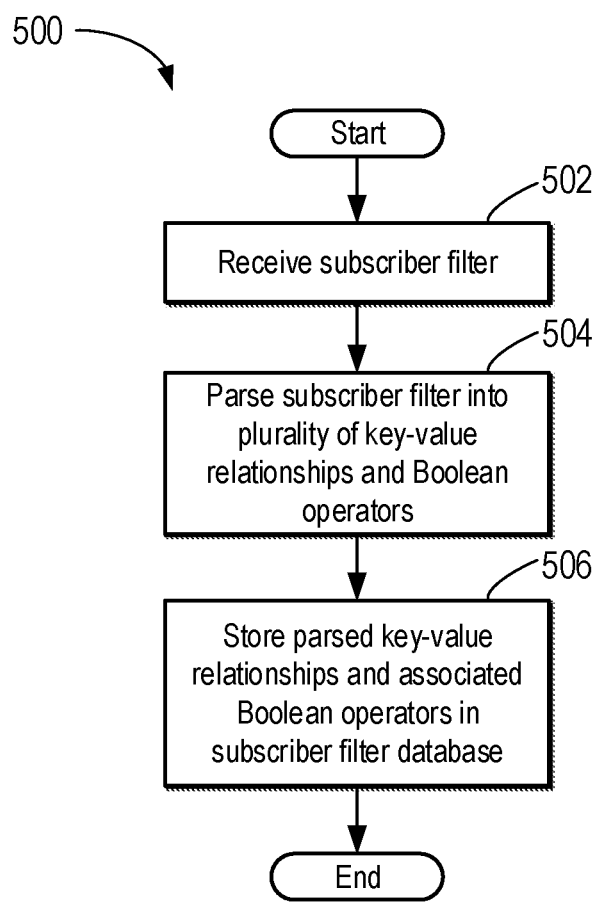
FIG. 5 shows a high level flowchart of an example method for registering a free-form Boolean event filter and an associated callback mechanism with an event conduit, in accordance with an embodiment of the present disclosure.

Turning to FIGS. 3, 4, and 5, example methods 300, 400, and 500 are shown. One or more of methods 300, 400, and 500 may be stored in non-transitory memory of one or more computing systems implementing an event conduit. One or more steps of methods 300, 400, and 500 may be executed by an event conduit, such as event conduit 102, as part of a flexible event service for distributing events produced by a plurality of event producers, to one or more of a plurality of event subscribers based subscriber filters registered with the event conduit.

Turning to FIG. 3, a high level flowchart illustrating an example method 300 which may be executed by an event conduit is shown. Method 300 comprises receiving an event from an event producer, logging the event into an event transmission queue for later processing, parsing the event into a plurality of key-value pairs, validating that the plurality of key-value pairs match a reference event structure corresponding to an event-type ID included within the event responsive to the event including an event-type key and corresponding event-type ID, generating an event distribution list comprising subscriber endpoints associated with subscriber filters matching the received event, and transmitting the event to the subscriber endpoints included within the event distribution list. Method 300 provides that each of the subscriber filters comprises one or more key-value relationships linked via Boolean operators to form a single Boolean expression, and a received event is considered to "match" a subscriber filter when the Boolean expression of the subscriber filter evaluates to a truth value of true, when the Boolean expression is evaluated using the key-value pairs of the event. In this way, a streamlined process of event distribution may be enabled, wherein event producers need only account for a single event sink (the event conduit) and wherein event subscribers need only account for a single event source (the event conduit), thereby reducing unnecessary coupling between event producers and event subscribers, which may reduce data exposure. Further, by matching events to event subscribers by evaluating a Boolean filter, which may comprise one or more key-value relationships, a greater flexibility/control over the range of events which a subscriber may receive may be enabled.

Method 300 begins at step 302. Step 302 may include receiving an event at an event conduit endpoint. In one example the event conduit may expose its functionality via HTTP REST endpoints, which may be freely written to by one or more of a plurality of event producers. Events transmitted to an event conduit endpoint may undergo initial validation to determine if the event originated from a trusted location, and/or to determine that the event comprises a plurality of key-value pairs which can be parsed by downstream modules/routines/process of the event conduit (as used herein in the context of an event conduit, downstream may refer to processes or systems which operate on an event later in time than a currently occurring process). Method 300 may then proceed to step 304.

At 304, method 300 includes logging an event into an event transmission queue, such as event transmission queue 104. In one example, events may be time-stamped upon entering the event transmission queue, and an event conduit may determine an order of downstream processing for events within an event transmission queue based on the time-stamp, such as in a first-in first-out approach. In another example, events logged into the event transmission queue may be prioritized for expedient downstream processing based on the structure of the event, and/or based upon inclusion within the event of one or more key-value pairs indicating a time sensitivity of the event. As an example, inclusion within an event of a time-sensitivity key, and a corresponding time-sensitivity value of "high", an event logged in an event transmission queue may be selected for downstream processing and distribution before events with a likewise indicated time-sensitivity value of "low". Upon logging of the event with an event transmission queue, method 300 may then proceed to step 306.

At step 306, method 300 may include parsing the event. In one example, an event parser module, such as parser module 110, may select an event stored in an event transmission queue, and may parse/split/separate the selected event into a plurality of key-value pairs. In one example, key-value pairs are delimited by a pre-specified first delimiter character. In another example, key-value pairs may be parsed into a key and a corresponding value based on a second delimiter character, which may be distinct from the first delimiter character. Delimiter characters may comprise colons, commas, quotation marks, or any other computer recognizable character. Upon completion of event parsing, method 300 may then proceed to step 308.

At 308, method 300 includes determining if the event includes an event-type ID. If at 308 it is determined that the event does not comprise an event-type ID, method 300 may proceed directly to step 316, where the event conduit may generate an event distribution list based on comparison between the plurality of key-value pairs comprising the event and the plurality of event subscriber filters (discussed in more detail below with reference to method 400 of FIG. 4). Upon generation of the event distribution list, method 300 may proceed to step 318, which may include transmitting the event to the one or more subscriber endpoints included within the generated event distribution list. Method 300 may then end.

However, if at 308 it is determined that the event comprises an event-type ID, method 300 may proceed to step 310. Step 310 includes comparing the plurality of key-value pairs comprising the event with a reference event structure. In one example, the reference event structure may be obtained by searching a reference event structure database, such as event structure database 120, and matching the event-type ID included with the event to an event-type ID used to index the reference event structures stored within the event structure database. By indexing reference event structures stored within a reference event structure database according to a uniquely identifying alpha-numeric event-type ID, rapid lookup and validation of a structure of an event may be enabled. Following comparison of the event structure with the reference event structure, method 300 may proceed to step 312, which includes the event conduit determining if the event matches a format/structure indicated by the reference event structure. If at 312 it is determined that the event structure matches the format/structure indicated by the reference event structure, method 300 may proceed to generate an event distribution list at step 316, and transmit the event to the subscriber endpoints indicated by the event distribution list at step 318, as discussed in more detail above. Following step 318, method 300 may end. However, if at step 312, the event conduit determined that the event structure did not conform to a format/structure indicated by the reference event structure, method 300 may proceed to step 314.

At step 314, method 300 may include transmitting a rejection notification to the event producer(s), wherein the rejection notification indicates to the event producer(s) that the event has been rejected by the event conduit responsive to the event structure deviating from the event structure indicated by the event-type ID. In one example, a rejection notification may comprise a description of the reason(s) for rejection of the event, such as an indication of how the event deviated from the event structure indicated by the event-type ID. In another example, step 314 may further comprise flagging the rejected event, where the flag indicates that the flagged event is not to be distributed to event subscribers. In another example, flagging the event with a rejection flag may designate the event for deletion. By rejecting (that is, by not distributing) events which do not conform to the event structure indicated by an event-type key and corresponding event-type ID included within the event, the probability that a downstream process, or event subscriber, may incorrectly take a dependency on the event may be reduced. Incorrectly taking a dependency on an event is herein defined as taking a dependency based on an assumption that an event including a specific event-type ID possesses a structure conforming to a format indicated by the event-type ID). Following transmission of the rejection notification to the event producer(s), method 300 may end.

Turning to FIG. 4, a high level flowchart of an example method 400 for generating an event distribution list for a received event is shown. Method 400 includes evaluating the truth values of a plurality of key-value relationships comprising one or more subscriber filters, based on the plurality of key-value pairs of the received event. Method 400 further includes evaluating a truth value for each of the plurality of subscriber filters by combining the truth values of each of the key-value relationships comprising the subscriber filters using Boolean algebra. Upon a subscriber filter evaluating to a truth value of true (in other words, based upon the current event matching/satisfying a subscriber filter), method 400 further includes the event conduit adding subscriber endpoints associated with the subscriber filter to the event distribution list. In this way, events may be efficiently matched to subscriber filters comprising freeform Boolean expressions, enabling subscribers to flexibly subscribe to a range of events specifically tailored to the individual interests of the subscriber. Additionally, the computational complexity of determining if a subscriber filter matches an event may be reduced by enabling each sub-expression (that is, each key-value relationship) comprising the subscriber filter to be evaluated independently and then combined into an overall truth value for the subscriber filter using Boolean algebra. Reducing the computational complexity may further enable a reduction in distribution time (distribution time as used herein may refer to a duration of time spanning from when an event conduit first receives an event to when the event is transmitted to event subscribers matching the event).

Method 400 begins at 402, which may include selecting a first key-value pair in an event. The event may comprise a plurality of key-value pairs. In one example the event may be pre-parsed, such as by an event parser of the event conduit. In another example, the event may be evaluated without prior parsing. In one example, selection of a first key-value pair may comprise selection of a key-value pair according to a pre-defined order of key-value pair selection. In one example, a pre-defined order of key-value pair selection may comprise selection of key-value pairs based on position within an event, such that key-value pairs occurring first in position, may be selected first. In another example, a pre-defined order of key-value pair selection may comprise selecting a first key-value pair based on numerical and/or alphabetical order of keys, and/or values. In another example, selection of a first key-value pair may be determined at the time of selection based upon one or more parameters of the key-value pair. As one example, a key-value pair may be selected based upon a length of the key-value pair, such as in a longest to shortest selection strategy. Upon selection of a first key-value pair from a received event, method 400 may proceed to step 404.

At step 404, method 400 may include accessing subscriber filters. In one example, accessing subscriber filters may comprise accessing a subscriber filter database, and selecting each subscriber filter for parallel comparison with the current key-value pair of the event. In another example accessing subscriber filters may comprise simultaneous selection of each subscriber filter for simultaneous/parallel evaluation/comparison with the current selected key-value pair of the event, which may thereby reduce a duration of the evaluation process. Upon accessing subscriber filters, method 400 may then proceed to 406.

At 406, method 400 may include evaluating one or more key-value relationships (which may herein also be referred to as filter expressions) of the currently selected subscriber filter(s) which match the key of the currently selected key-value pair of the event. In one example, key-value relationships may be stored in a subscriber filter database, and further, the key-value relationships within the subscriber filter database may be indexed by both subscriber ID (thus linking each key-value relationship to a subscriber) as well as indexed by key, such that key-value relationships including a specific key (that is, one or more of the terms of the expression of the relationship comprise the key), or a value associated with a specific key, may be rapidly obtained by querying the subscriber filter database using a given key (wherein a key comprises an alpha-numeric combination of characters, that is, the key may comprise a series of letters, a series of numbers, or a series of letters and numbers). In one example, based on a current selected key-value pair comprising a key of k1, and a value of V1, each key-value relationship including (or indexed by) k1 within the currently selected subscriber filter(s) may be evaluated by assessing if the currently selected key-value pair satisfies the corresponding key-value relationships. As used herein, a key-value relationship being satisfied by a key-value pair may refer to a mathematical equality or inequality expressed by the key-value relationship being logically and/or mathematically consistent upon substitution of one or more terms within the expression (which correspond to the key and or value of the key-value pair) by the key and/or value of the key-value pair. In another example, a key-value relationship may comprise a comparison of string literals, such as in the expression k1=="HealthcareDataset", and such a key-value relationship may be satisfied based on the variable k1 (corresponding to the key) being a string comprising "HealthcareDataset". In one example, a subscriber filter expression/key-value relationships may comprise an equation or inequality relating the value of the key and/or value to each other, or to one or more constants. As an example, a subscriber filter expression may comprise an inequality relating to a value associated with a key (such as k1 from the previous example), such as V1<C, where C is a real number, and wherein the filter expression is satisfied (that is, has a truth value of true) when the numerical value of "V1" is consistent with the filter expression, that is, when the value of V1 indicated by the key-value pair is less than the value of C, such as when V1 is equal to 1, and C is equal to 10. Said another way, a filter expression may comprise a mathematical equality or inequality, comprising one or more variables corresponding to the key and/or value of a key-value pair of an event, and a key-value pair of an event satisfies/matches a filter expression when the variable terms of the expression are replaced by the numerical values of the key and/or value and the resulting expression is logically/mathematically consistent and/or solved. As an example, for a filter expression comprising k2=="TimeStamp" and V2>"2018-01-14T20:15:10", a key-value pair with k1="TimeStamp" and V2="2018-02-28T10:35:12" would be considered as satisfying, or matching, the filter expression/key-value relationship. If at 406 it is determined that the currently selected key-value pair satisfies the currently selected key-value relationship(s), method 400 may proceed to 410, whereat method 400 may include setting a truth value of the key-value relationship(s) to true, before proceeding to step 416. However, if at step 406 it is determined that the currently selected key-value pair does not satisfy the currently selected key-value relationship(s), method 400 may proceed to 408, whereat method 400 may include setting a truth value of the key-value relationship(s) to false. In either case, method 400 may proceed to step 416.

At 416, method 400 may comprise evaluating if the currently selected key-value pair is equal to the last key-value pair in event. Evaluating if the currently selected key-value pair is the last key-value pair of an event may occur according to any conventional method for iterating through lists of items or data structures. If at 416 it is determined that the currently selected key-value pair is not the last key-value pair to be evaluated, method 400 may proceed to select the next key-value pair from the current event at step 418. Method 400 may then return to 404, whereat the steps of iterating through each subscriber filter, and evaluating the truth value for each of the key-value relationships within each of the subscriber filters for the currently selected key-value pair, as discussed in more detail above, may continue. However, if at 416, it is determined that the currently selected key-value pair is the last key-value pair in the current event, method 400 may proceed to step 420.

At step 420, method 400 may comprise determining a truth value of each subscriber filter by combining the truth values of each key-value relationship comprising each subscriber filter according to Boolean logic. In one example, each subscriber filter may comprise a plurality of key-value relationships, each logically joined via a Boolean operator, such as AND and OR, and a cumulative/overall/total/combined truth value for a subscriber filter may be obtained by combining each of the truth values determined at step 406 according to Boolean algebra and the conjunctive Boolean operator. As a more specific example, a subscriber filter comprising two key-value relationships joined via a Boolean OR operator, may have a combined truth value of true when one or both of the key-value relationships comprising the subscriber filter are true (as previously determined). In another example, a subscriber filter comprising two key-value relationships joined via Boolean AND operator may have a combined truth value of false when one or both of the key-value relationships comprising the subscriber filter have a truth value of false. In yet another example, more complex subscriber filters, comprising a plurality of key-value relationships joined by Boolean AND and/or OR operators may be likewise evaluated, by breaking the expression into a plurality of binary expressions (such as given in the two examples above), determining a combined truth value for the binary expression, and then feeding the combined truth value for the binary expression back into the overall subscriber filter expression, and repeating this procedure until the subscriber filter expression is reduced/evaluated to, a single truth value. Once a truth value for each of the plurality of subscriber filters stored within a subscriber filter database has been determined, method 400 may then proceed to step 422

At step 422, method 400 may include adding subscriber endpoints associated with each subscriber filter having a determined truth value of true to a distribution list. In one example, each subscriber filter within the subscriber filter database may be indexed according to a subscriber ID, wherein each subscriber ID is further indexed/linked with one or more subscriber endpoints, indicating a digital address to which events are to be routed upon matching a subscriber filter. In one example, based on the plurality of key-value pairs comprising the event, a subset of subscriber endpoints linked with a subscriber ID may be added to an event distribution list generated for a given event. In other words, subscribers may include subscriber endpoints which may be used for event transmission in the case of certain events, but not used in the case of others, based on the event structure, such as when the event comprises a specific event-type ID. After generating the event distribution list for the current event in the manner described above, method 400 may then end.

Thus, method 400 may enable rapid evaluation of subscriber filters comprising freeform Boolean expressions, by evaluating each key-value relationship independently, followed by determining an overall truth value for the subscriber filter by combining each of the plurality of determined truth values for each of the key-value relationships using Boolean algebra on pairs of key-value relationships. This may enable rapid evaluation of even subscriber filters comprising a large number of key-value relationships.

Turning now to FIG. 5, an example method 500 for registering a subscriber filter and subscriber endpoints with an event conduit is shown. Method 500 may be executed by a server, such as server 202, implementing an event conduit, such as event conduit 102. Method 500 may enable a plurality of subscribers to register with an event conduit rapidly, and easily, while enabling the subscriber to specify a customized subscriber filter indicating the range of events/event types in which the subscriber has an interest.

Method 500 begins at 502, whereat method 500 may include receiving a subscriber filter at an HTTP endpoint of the event conduit. In one example, the HTTP endpoint may comprise an HTTP REST endpoint. After a subscriber filter has been received by the event conduit, method 500 may then proceed to step 504.

At step 504, method 500 may comprise parsing the received subscriber filter into plurality of key-value relationships and Boolean operators. In one example, parsing may occur based on delimiter characters separating each of the plurality of key-value relationships, and/or by matching one or more expression within the received subscriber filter with one or more pre-determined characters and/or strings. Once the received subscriber filter has been parsed, method 500 may then proceed to step 506.

At step 506, method 500 may comprise storing the parsed key-value relationships and associated Boolean operators in a subscriber filter database. In one example, each of the plurality of key-value relationships may be stored in a separate entry within a subscriber filter database, each entry may further include the Boolean operator connecting the key-value relationship to one or more additional key-value relationships. The entries in the subscriber filter database may be indexed by one or more parameters enabling rapid query. For example, each entry within a subscriber filter database, comprising a key-value relationship and associated Boolean operator, may be indexed according to subscriber ID, and/or key. As a more specific example, the event conduit may label each new subscription with a unique subscriber ID, uniquely identifying the subscriber filter and/or subscriber endpoints registered with the event conduit, thereby enabling rapid linking between an identified or matched subscriber filter, a subscriber, and one or more subscriber endpoints. Once the parsed key-value relationships have been stored within the subscriber filter database, method 500 may then end.

In this way, method 500 enables a streamlined event subscription process for event subscribers by enabling a subscriber to register to receive a personalized plurality of events, from a single event source (the event conduit) by specifying a single subscriber filter and registering this subscriber filter with the event conduit. Further, the registration process may comprise specifying one or more subscriber endpoints to receive events based upon the event structure matching/satisfying the specified subscriber filter, thus, event subscribers may be given control over ways in which event events are transmitted to one or more associated subscriber endpoints. Method 500 may thereby reduce redundant coupling between event subscribers and event producers, and may further increase an efficiency of event allocation and distribution by employing a novel freeform Boolean expression based filtering algorithm (such as discussed in more detail above with reference to FIG. 4).

Turning to FIG. 6, an example subscriber filter database 600 is shown. Subscriber filter database is one example of a subscriber filter database according to the current disclosure. Subscriber filter database comprises entries (rows) which each further comprise one or more keys, one or more values, one or more mathematical relationships (e.g. indicating an inequality or equality. Each entry in subscriber filter database 600 may comprise a distinct key-value relationship, and each entry may further comprise a Boolean operator logically linking the key-value relationship of the current row, with one or more additional key-value relationships. Each row may be indexed according to subscriber ID, thereby enabling a computing system to rapidly access one or more key-value relationships of a subscriber filter, for a given subscriber.

Turning now to FIG. 7, an example event 700 is shown. Event 700 comprises a plurality of key-value pairs, in a dictionary structure, each key separated from a corresponding value with a colon, ":", character. The colon in this case may be considered as the delimiter character separating keys and corresponding values of a key-value pair. Event 700 comprises an event-type key indicated by "event-type key" and a corresponding event type ID indicated by "RawDataIngestionComplete", indicating the specific event-type to which event 700 corresponds. Event 700 further comprises an HTTP address indicating a digital address to send/transmit the event to.

Turning now to FIG. 8, an example event subscription packet 800, which may be transmitted to an event conduit as part of an event subscription process, such as that discussed in more detail above with reference to FIG. 5, is shown. Event subscription packet 800 comprises a callback mechanism/endpoint, indicated by an HTTP endpoint (a URL in this example). Event subscription packet 800 further comprises a subscriber filter comprising a plurality of key-value relationships. Event subscription packet 800 also comprises an HTTP address indicting a digital address to send/transmit the event subscription packet to. In one example, the HTTP address indicating where to transmit the event subscription packet indicates an HTTP REST endpoint of an event conduit.

FIG. 9 illustrates another example of an event subscription packet, event subscription packet 900, which may be transmitted to an event conduit as part of an event subscription process, such as in method 500, discussed in more detail above. Event subscription packet 900 comprises an SQS callback mechanism, a subscriber filter comprising a plurality of key-value relationships, and a routing address (a digital address indicating a destination/digital location to which the event subscription packet is to be sent). Transmitting an event subscription packet, such as event subscription packet 900, to an event conduit, may enable rapid and convenient event subscription for event subscribers.

Thus, the current disclosure provides systems and methods for a process of event distribution, which may streamline the process of both event subscription, and event distribution, by providing an event conduit, which may receive events from a plurality of event producers, and distribute events to a plurality of event subscribers, based on the events matching subscriber filters registered with the event conduit. The subscriber filters may comprise freeform Boolean expressions, stored within an event subscriber database, and indexed according to subscriber ID and key. As the subscriber filters may comprise one or more key-value relationships, greater flexibility in the range of events to which a subscriber subscribes may be enabled. Further, event distribution efficiency and speed may be increased by matching subscriber filters with received events by first evaluating the truth value of each key-value relationship comprising each subscriber filter, and then evaluating the truth value of the subscriber filters by combining the truth values of the key-value relationships using Boolean algebra.

The disclosure also provides support for a method comprising: receiving an event from an event producer at an endpoint of an event conduit, wherein the event comprises a plurality of key-value pairs; parsing the event into the plurality of key-value pairs; determining a truth value for each of a plurality of subscriber filters based on the plurality of key-value pairs and Boolean algebra, wherein each of the plurality of subscriber filters comprises a Boolean expression comprising one or more key-value relationships; adding a subscriber endpoint to a plurality of subscriber endpoints within an event distribution list, wherein the subscriber endpoint is linked with a subscriber filter of the plurality of subscriber filters, and wherein the subscriber filter has a determined truth value of true; and transmitting the event to the plurality of subscriber endpoints within the event distribution list. In a first example of the method, wherein the event comprises a key-value pair comprising an event-type key and an event-structure ID. In a second example of the method, optionally including the first example, the method further comprising; looking-up a reference event structure in an event structure database, wherein the reference event structure is uniquely identified by the event structure ID; comparing the event with the reference event structure; and removing the event-type key and event structure ID from the event responsive to the event not matching the reference event structure. In a third example of the method, optionally including the first and second examples, wherein the plurality of subscriber filters comprise freeform Boolean expressions registered with an event conduit by event subscribers and stored within a subscriber filter database of the event conduit. In a fourth example of the method, optionally including the first through third examples, wherein the endpoint of the event conduit comprises a single HTTP endpoint. In a fifth example of the method, optionally including the first through fourth examples, wherein the subscriber endpoint comprises at least one of an email address, an SMS address, and an HTTP endpoint. In a sixth example of the method, optionally including the first through fifth examples, the method further comprising displaying the event on a display subsystem of a computing device corresponding to the subscriber endpoint. In a seventh example of the method, optionally including the first through sixth examples, wherein the event producer comprises a healthcare database, and wherein the event is produced responsive to data ingestion by the healthcare database. In an eighth example of the method, optionally including the first through seventh examples, wherein each of the plurality of subscriber filters uniquely corresponds to a subscriber registered with an event conduit.

The disclosure also provides support for a method for an event conduit comprising: receiving a subscriber filter at an HTTP endpoint of the event conduit; receiving one or more subscriber endpoints associated with the subscriber filter; parsing the subscriber filter into a plurality of key-value relationships, wherein the plurality of key-value relationships are logically connected by a plurality of Boolean operators; receiving an event from a database, wherein the event comprises a plurality of key-value pairs; determining a plurality of truth values for the plurality of key-value relationships based on the plurality of key-value pairs; determining a truth value for the subscriber filter based on the plurality of truth values of the plurality of key-value relationships and further based on the plurality of Boolean operators; adding the one or more subscriber endpoints to an event distribution list responsive to the truth value being true; and distributing the event to the one or more subscriber endpoints. In a first example of the method, wherein an order of the distribution to the one or more subscriber endpoints is based on the plurality of key-value pairs of the event. In a second example of the method, optionally including the first example, wherein the plurality of key-value pairs comprises an event-type key and an event-structure ID. In a third example of the method, optionally including the first and second examples, wherein an order of the distribution to the one or more subscriber endpoints is based on the event-structure ID. In a fourth example of the method, optionally including the first through third examples, the method further comprising storing each of the plurality of key-value relationships within a subscriber filter database of the event conduit. In a fifth example of the method, optionally including the first through fourth examples, wherein the database comprises a healthcare database, and the event comprises ingestion of new data by the healthcare database.

The disclosure also provides support for a server implementing an event conduit in communication with an event producer and event subscriber, the server comprising: a logic subsystem; a communication subsystem; and a data-holding subsystem storing instructions executable by the logic subsystem to: receive a subscriber filter from the event subscriber; parse the subscriber filter into a plurality of key-value relationships; receive an event from the event producer, wherein the event comprises a plurality of key-value pairs; determine a truth value for the subscriber filter based on the plurality of key-value relationships and the plurality of key-value pairs; and transmit the event to the event subscriber responsive to the truth value for the subscriber filter equaling true. In a first example of the system, wherein the data-holding subsystem further comprises an event structure database and a subscriber filter database. In a second example of the system, optionally including the first example, wherein the instructions are further executable by the logic subsystem to store the plurality of key-value relationships in a subscriber filter database, wherein each of the plurality of key-value relationships is indexed with a subscriber ID. In a third example of the system, optionally including the first and second examples, wherein the plurality of key-value pairs comprises an event-type key and an event-type ID, wherein the instructions are further executable by the logic subsystem to compare the plurality of key-value pairs of the event with a reference event structure stored in the event structure database, wherein the reference event structure is indexed with an alpha-numeric ID matching the event-type ID. In a fourth example of the system, optionally including the first through third examples, wherein the instructions are further executable to lookup one or more key-value relationships stored in the subscriber filter database based on a subscriber ID indexed with the one or more key-value relationships.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
    receiving an event from an event producer at an endpoint of an event conduit, wherein the event comprises a plurality of key-value pairs, wherein the event producer comprises a healthcare database, and wherein the event is produced responsive to data ingestion by the healthcare database;
    parsing the event into the plurality of key-value pairs;
    determining a truth value for each of a plurality of subscriber filters based on the plurality of key-value pairs and Boolean algebra, wherein each of the plurality of subscriber filters comprises a Boolean expression comprising one or more key-value relationships;
    adding a subscriber endpoint to a plurality of subscriber endpoints within an event distribution list, wherein the subscriber endpoint is linked with a subscriber filter of the plurality of subscriber filters, and wherein the subscriber filter has a determined truth value of true; and
    transmitting the event to the plurality of subscriber endpoints within the event distribution list.

2. The method of claim 1, wherein the event comprises a key-value pair comprising an event-type key and an event-structure ID.

3. The method of claim 2, further comprising:
    looking-up a reference event structure in an event structure database, wherein the reference event structure is uniquely identified by the event structure ID;
    comparing the event with the reference event structure; and
    removing the event-type key and event structure ID from the event responsive to the event not matching the reference event structure.

4. The method of claim 1, wherein the plurality of subscriber filters comprise freeform Boolean expressions registered with an event conduit by event subscribers and stored within a subscriber filter database of the event conduit.

5. The method of claim 4, wherein the endpoint of the event conduit comprises a single HTTP endpoint.

6. The method of claim 1, wherein the subscriber endpoint comprises at least one of an email address, an SMS address, and an HTTP endpoint.

7. The method of claim 1, further comprising displaying the event on a display subsystem of a computing device corresponding to the subscriber endpoint.

8. The method of claim 1, wherein the healthcare database comprises one or more databases relating to a plurality of patients, a plurality of medical procedures, a plurality of billing statements, a plurality of medical charts, a plurality of healthcare cost estimates, and a plurality of healthcare outcomes.

9. The method of claim 1, wherein each of the plurality of subscriber filters uniquely corresponds to a subscriber registered with an event conduit.

10. A method for an event conduit comprising:
    receiving a subscriber filter at an HTTP endpoint of the event conduit;
    receiving one or more subscriber endpoints associated with the subscriber filter;
    parsing the subscriber filter into a plurality of key-value relationships, wherein the plurality of key-value relationships are logically connected by a plurality of Boolean operators;
    receiving an event from a database, wherein the event comprises a plurality of key-value pairs, wherein the database comprises a healthcare database, and wherein the event is produced responsive to ingestion of new data by the healthcare database;
    determining a plurality of truth values for the plurality of key-value relationships based on the plurality of key-value pairs;
    determining a truth value for the subscriber filter based on the plurality of truth values of the plurality of key-value relationships and further based on the plurality of Boolean operators;
    adding the one or more subscriber endpoints to an event distribution list responsive to the truth value being true; and
    distributing the event to the one or more subscriber endpoints.

11. The method of claim 10, wherein an order of the distribution to the one or more subscriber endpoints is based on the plurality of key-value pairs of the event.

12. The method of claim 10, wherein the plurality of key-value pairs comprises an event-type key and an event-structure ID.

13. The method of claim 12, wherein an order of the distribution to the one or more subscriber endpoints is based on the event-structure ID.

14. The method of claim 10, further comprising storing each of the plurality of key-value relationships within a subscriber filter database of the event conduit.

15. The method of claim 10, wherein the healthcare database comprises one or more databases relating to a plurality of patients, a plurality of medical procedures, a plurality of billing statements, a plurality of medical charts, a plurality of healthcare cost estimates, and a plurality of healthcare outcomes.

16. A server implementing an event conduit in communication with an event producer and event subscriber, the server comprising:
- a logic subsystem;
- a communication subsystem; and
- a data-holding subsystem storing instructions executable by the logic subsystem to:
  - receive a subscriber filter from the event subscriber;
  - parse the subscriber filter into a plurality of key-value relationships;
  - receive an event from the event producer, wherein the event comprises a plurality of key-value pairs, wherein the event producer comprises a healthcare database, and wherein the event is produced responsive to data ingestion by the healthcare database;
  - determine a truth value for the subscriber filter based on the plurality of key-value relationships and the plurality of key-value pairs; and
  - transmit the event to the event subscriber responsive to the truth value for the subscriber filter equaling true.

17. The server of claim 16, wherein the data-holding subsystem further comprises an event structure database and a subscriber filter database.

18. The server of claim 17, wherein the instructions are further executable by the logic subsystem to store the plurality of key-value relationships in the subscriber filter database, wherein each of the plurality of key-value relationships is indexed with a subscriber ID.

19. The server of claim 17, wherein the plurality of key-value pairs comprises an event-type key and an event-type ID, wherein the instructions are further executable by the logic subsystem to compare the plurality of key-value pairs of the event with a reference event structure stored in the event structure database, wherein the reference event structure is indexed with an alpha-numeric ID matching the event-type ID.

20. The server of claim 17, wherein the instructions are further executable to lookup one or more key-value relationships stored in the subscriber filter database based on a subscriber ID indexed with the one or more key-value relationships.

* * * * *